Oct. 31, 1961   O. GROSSKINSKY ET AL   3,006,953
CHLOROALKYLATION OF ORGANIC COMPOUNDS
Filed May 1, 1958
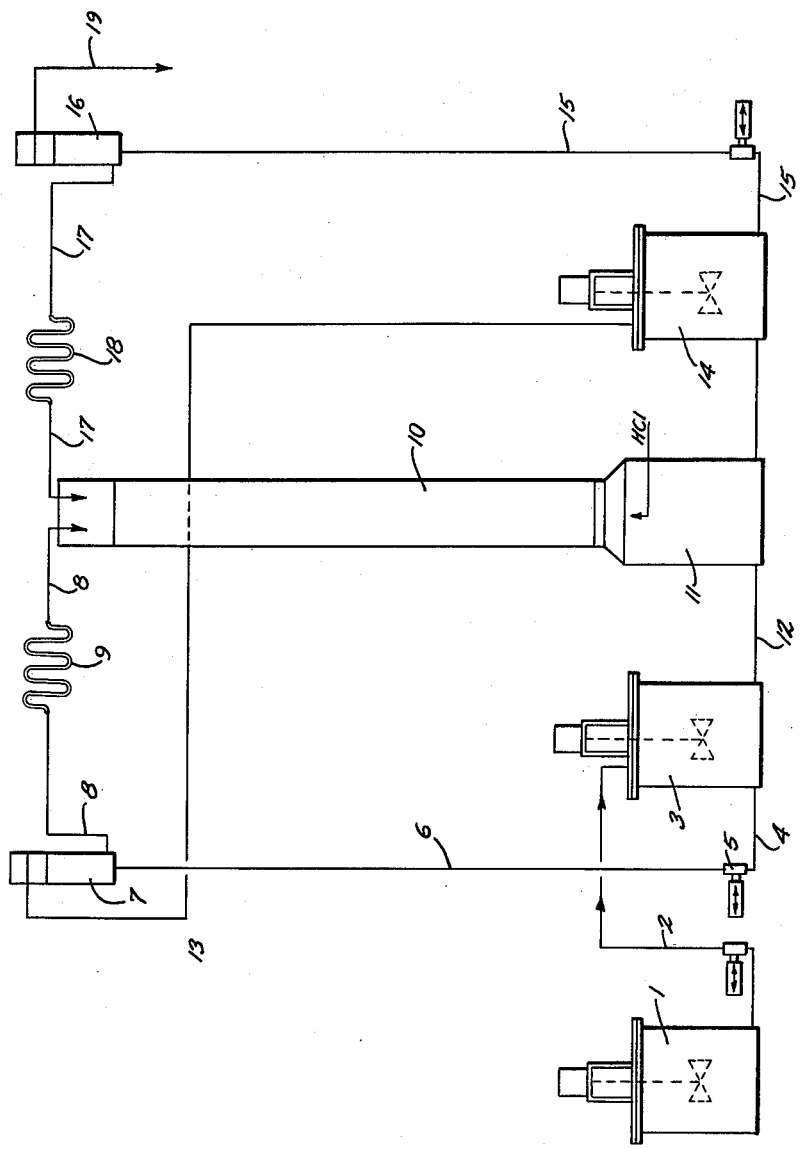
INVENTORS
BY
ATTORNEY 3,006,953
CHLOROALKYLATION OF ORGANIC
COMPOUNDS
Otto Grosskinsky, Dortmund-Kirchhorde, Anton Benning, Dortmund-Eving, and Winfried Glass, Dortmund-Lindenhorst, all in Germany, assignors to Bergwerksverband G.m.b.H., Essen, Germany
Filed May 1, 1958, Ser. No. 732,215
Claims priority, application Germany May 2, 1957
8 Claims. (Cl. 260—521)

The present invention relates to a method of improving the haloalkylation of organic compounds and particularly to an improved method for the haloalkylation of aromatic compounds such as toluene, xylenes and the like.

The reaction of toluene with concentrated hydrochloric acid and formaldehyde at about 70° C. under vigorous agitation is known for the production of a mixture of para and ortho chloromethyl-toluene. The reaction time for this reaction requires about 20 hours even if a vigorous stream of hydrogen chloride is passed through the reaction mixture some hours after the start of the reaction.

It is a primary object of the present invention to provide an improved method for the haloalkylation of organic compounds such as toluene whereby the reaction time is considerably shortened and the yield is increased. The overall yield per unit time period is of course greatly improved by proceeding in accordance with the method of the invention.

It has been found in accordance with the present invention that the reaction velocity of haloalkylation can be considerably increased by making certain that a practically constant optimum saturation of the reaction mixture in hydrogen halide is maintained throughout the reaction. It has been found that if the high concentration of hydrogen halide is maintained, i.e. practically complete saturation of hydrogen halide, in the reaction mixture throughout the reaction it is possible to complete the reaction with high yield in a much shorter time period, e.g. two hours or even less.

It was first attempted to maintain the saturation of the reaction mixture in hydrogen halide during the reaction by continuously passing a vigorous stream of the hydrogen halide, e.g. hydrogen chloride into the reaction mixture during the course of the reaction. However, it was found that under the reaction conditions mentioned there is no appreciable removal of hydrogen chloride from the reaction mixture during the reaction so that it was found that this method of assuring saturation of the reaction mixure in hydrogen chloride is not truly satisfactory. The HCl concentration of the hydrochloric acid decreases from about 37% at the beginning of the conversion rather rapidly to below 30%; water is at the same time formed during the reaction as the hydrogen chloride concentration is decreasing.

It is therefore a further object of the present invention to provide a method of carrying out the haloalkylation of organic compounds while maintaining practically optimum constant saturation of the reaction mixture in hydrogen halide by providing a new and improved method which permits the maintaining of the high degree of saturation of the reaction mixture throughout the reaction. In accordance with the present invention the concentration of hydrogen halide, e.g. hydrochloric acid throughout the reaction is maintined at a concentration of at least 30%, and most preferably at a concentration of more than 35%.

It has been found in accordance with the present invention that a sufficient saturation of the reaction mixture with hydrogen halide is achieved throughout the entire course of the reaction by the simple expedient of first heating the reaction mixture to the proper reaction temperature which is generally above 50° C., preferably between 50 and 90° C. and most preferably 60–70° C. The entire reaction mixture is then cooled after the reaction has proceeded for a relatively short time, saturating the cooled reaction mixture at room temperature or below with the hydrogen halide, again heating the reaction mixture to the reaction temperature, e.g. about 60–70° C. so as to continue the reaction, and repeating these steps of cooling, saturation with hydrogen halide and reheating several times until the reaction is completed. It has been found that by proceeding in this manner the reaction time for complete haloalkylation generally amounts to 1 to 2 hours, depending upon the organic compound used as the starting material. By simultaneous internal heating with heated rods or the like, the reaction time can be still further shortened, or alternatively the hydrogen halide saturation or the complete reaction can be carried out under increased pressure. The conversion of the starting material by proceeding in this manner generally amounts to above 95%.

Although the present invention will be mainly discussed with respect to the chloromethylation of toluene, it will be understood that the invention is applicable in general to the haloalkylation of many other organic compounds, particularly aromatic compounds. Thus, the method of the present invention is applicable, for example, to the haloalkylation of benzene, toluene, o-, m- and p-xylene, ethylbenzene, propylbenzene, cumene, pseudocumene, mesitylene, durene, isodurene, prehnitene, p-cumene, n-butylbenzene, tert-amylbenzene, p-tert-butyltoluene, 1,3-dimethyl-5-tert-butylbenzene, 1,3,5-triethylbenzene, 1,3,5-triisopropyl-benzene, cyclohexylbenzene, biphenyl, hydrindene, naphthalene, α-methylnaphthalene, β-methylnaphthalene, tetralin, acenaphthene, anthracene, phenanthrene, 1,2-benzanthracene, benzylchloride, benzylbromide, phenol, o-cresol, p-cresol, o-, p- and m-nitrophenols, salicylic acid, m- and p-hydroxybenzoic acid, n-butylphenylether, methylmesitylether, hydroquinonedimethylether, anisole, phenylether, methylphenylthioether, methyl-p-tolyl-thioether, salicaldehyde, anisaldehyde, 2,4-dimethylacetophenone, acetomesitylene, benzylmesitylene, and 2,4,6-triethylacetophenone, as well as the halogen derivatives thereof.

Furthermore, although the reaction will generally be discussed with reference to chloromethylation utilizing hydrogen chloride as the hydrogen halide, it is to be understood that other hydrogen halides than hydrogen chloride may be utilized in the method of the invention.

The aldehyde component of the reaction mixture may be any monomer or polymer or formaldehyde or acetaldehyde or paraldehyde. The reaction speed can be further accelerated by the addition under certain conditions of catalysts such as zinc chloride or arsenic oxide. However, the use of such catalysts generally results in the inclusion of impurities in the end products. From the above analysis of different reaction materials that may be used in the process of the invention it will be seen that the process is applicable to all the known haloalkylation reactions.

It is clear that a repeated cooling and heating of the whole reaction mixture requires a good heat exchange between the solution to be heated and cooled. It has also been found, however, that the object of the method can be achieved almost as well by withdrawing the reaction mixture from the reactor continuously, or part of it from time to time, cooling it, saturating it with hydrogen chloride, and preferably after heating by heat exchange, returning it to the reactor. The acceleration of the reaction is then considerable and without internal heating the reaction time amounts to only about 1 to 2 hours with toluene.

The method can be carried out continuously and with particular advantage by continuously supplying a reactor with fresh starting material and aldehyde, while a corresponding part of the reaction mixture is withdrawn and supplied to a collector, in which the aqueous phase is separated from the organic phase. It is also possible to withdraw the aqueous phase as such and saturate it alone with hydrogen chloride and return it to the reactor. The organic phase obtained in this method contains 40–80% haloalkylated aromatics according to the circulation velocity of the hydrogen chloride. The product can be subjected to a separate second or third chloroalkylation and a complete conversion of the starting material can thereby be obtained very rapidly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the accompanying drawing schematically illustrates apparatus that may be used for carrying out the method of the invention. The drawing will be used to illustrate the example for a continuous method of the chloromethylation of toluene. The scope of the example is not meant to be limited to the specific details of the example or of the apparatus which is schematically illustrated in the drawing.

*Example*

About 10 parts of toluene and 2½ parts of paraformaldehyde are continuously supplied per hour via a pipe 2 to the reaction vessel 3 from a supply container 1, in which reaction vessel 50 parts of a reaction mixture consisting of ten parts aromatics, e.g. toluene, 2½ parts aldehyde and 37½ parts concentrated hydrochloric acid are maintained with vigorous agitation at 60–70° C.

Corresponding to the added amount of toluene, the reaction mixture is removed through the pipe 4 by the circulatory pump 5 and the pipe 6. In the container 7, the organic phase is separated from the aqueous phase. The aqueous hydrochloric acid solution flows over a syphon tube 8 and a cooler 9 into a washing tower 10 and takes up hydrochloric acid, which is introduced in gaseous form from below, by counter current downward flow. The concentrated acid collects in a container 11 and returns as required via the pipe 12 to the reaction vessel.

The apparatus is completely enclosed and can therefore be operated if required under increased pressure, for example at 4 to 12 atmospheres or at 20 atmospheres or more.

The reaction product removed from the container 7 consists in general of about 60% chloromethyl-toluene. The remainder is unconverted toluene. The degree of enrichment is in general in direct proportion to the reaction velocity, as is achieved by the cooling, concentration and return of the hydrochloric acid. Higher conversion velocities require a more intense circulation of the hydrochloric acid, and at the same time effect a shortening of the duration of the starting material in the reaction container. The degree of conversion is then considerably decreased, so that a further increase of the reaction velocity is not achieved with increased circulation of the hydrochloric acid. According to the previous statements, the advantages of the method of the invention are best achieved in general if it is operated in such a manner that the separated organic phase contains about 60 to 70% of haloalkylated starting material.

The reaction product or a part of it together with the hydrochloric acid can now be returned to the reaction container, correspondingly increasing at the same circulation velocity of the hydrochloric acid the proportion of unconverted product in the separated organic phase. The addition of fresh toluene must then be correspondingly decreased.

It is particularly advantageous to pass the approximately 70% enriched solution continuously to a second reaction container and to subject it to a separate second haloalkylation according to the same method. An approximately 95% enrichment in haloalkylated product is obtained particularly quickly. An apparatus for the second chloroalkylation stage can easily be connected with the first or another haloalkylation apparatus by using for the concentration of the hydrochloride the same washing tower or the same concentration plant for several chloroalkylations.

The second chloroalkylation stage proceeds continuously according to the drawing in that the organic liquid separated from the aqueous phase in the separating vessel 7 is passed by way of a pipe 13 to the reactor 14. A further addition of aldehyde is no longer necessary as a rule. This shows that the aldehyde content of the hydrochloric acid of the common concentrating plant, insofar as it is supplied with aldehyde from the first stage, is fully sufficient to carry the reaction in the second stage to its conclusion.

The amount corresponding to a full reactor is continuously withdrawn per hour from the reactor 14 corresponding to the first chloroalkylation stage via the pipe 15, phrase separation occurs in the reactor 16 and the hydrochloric acid is led over a pipe 17 and a cooler 18 into the concentrating apparatus 10 from which it returns as required to the reaction container. The conversion product is withdrawn from the plant via the pipe 19 and contains about 96% chloromethyltoluene. A third chloroalkylation can be carried out if required or the product can be freed from unconverted toluene by distillation.

If xylene is subject to the method instead of toluene, the conversion to chloromethylzylene is 70% at least after a maximum of one hour's time and during a second stage is 95% after the same time.

While the invention has been illustrated and described as embodied in a method for the chloromethylation of toluene, it is not intended to be limited to the details of of this particular haloalkylation.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of chloroalkylating organic compounds, comprising the steps of heating a reaction mixture consisting essentially of an aromatic organic compound adapted to be chloroalkylated and being selected from the group consisting of benzene, toluene, or o-, m- and p-xylene, ethylbenzene, propylbenzene, cumene, pseudocumene, mesitylene, durene, isodurene, prehnitene, p-cumene, n-butylbenzene, tert-amylbenzene, p-tert-butyltoluene, 1,3-dimethyl-5-tert-butylbenzene, 1,3,5-triethylbenzene, 1,3,5-triisopropylbenzene, cyclohexylbenzene, biphenyl, hydrindene, naphthalene, α-methylnaphthalene, β-methylnaphthalene Tetralin, acenaphthene, anthracene, phenanthrene, 1,2-benz-anthracene, benzylchloride, benzylbromide, phenol, o-cresol, p-cresol, o-, p- and m-nitrophenols, salicylic acid, m- and p-hydroxybenzoic acid, n-butylphenylether, methylmesitylether, hydroquinonedimethylether, anisole, phenylether, methylphenylthioether, methyl-p-tolyl-thioether, salicaldehyde, anisaldehyde, 2,4-dimethylacetophenone, acetomesitylene, benzylmesitylene, and 2,4,6 - triethylacetophenone, an aqueous hydrogen chloride solution and an aldehyde selected from the group consisting of formaldehyde, acetaldehyde and polymers thereof at a temperature of about 50–90° C. so as to cause conversion of said aromatic organic compound to the corresponding chloroalkylated derivative thereof; cooling said reaction mixture to a temperature which is at most room temperature; introducing gaseous hydrogen chloride into the thus-cooled reaction mixture until said reaction mixture contains at least 30% hydrogen chloride; reheating said reaction mixture to a temperature above about 50° C.; and repeating the cooling, saturating and reheating steps until substantially complete conversion of said aromatic organic compound to the corresponding chloroalkylated derivative thereof.

2. A method of chloroalkylating organic compounds, comprising the steps of heating a reaction mixture consisting essentially of an aromatic organic compound adapted to be chloroalkylated and being selected from the group consisting of benzene, toluene, o-, m- and p-xylene, ethylbenzene, propylbenzene, cumene, pseudocumene, mesitylene, durene, isodurene, prehnitene, p-cumene, n-butylbenzene, tert-amylbenzene, p-tert-butyltoluene, 1-3-dimethyl-5-tert-butylbenzene, 1,3,5-triethylbenzene, 1,3,5-triisopropylbenzene, cyclohexylbenzene, biphenyl, hydrindene, naphthalene, α-methylnaphthalene, β-methylnaphthalene, Tetralin, acenaphthene, anthracene, phenanthrene, 1,2-benzanthracene, benzylchloride, benzylchloride, benzylbromide, phenol, o-cresol, p-cresol, o-, p- and m-nitrophenols, salicylic acid, and m- and p-hydroxy-benzoic acid, n-butylphenylether, methylmesitylether, hydroquinonedimethylether, anisole, phenylether, methylphenyl-thioether, methyl-p-tolyl-thioether, salicaldehyde, anisaldehyde, 2,4 - dimethylacetophenone, acetomesitylene, benzyl-mesitylene, and 2,4,6-triethylacetophenone, an aqueous hydrogen chloride solution and an aldehyde selected from the group consisting of formaldehyde, actaldehyde and polymers thereof at a temperature above about 50° C. so as to cause conversion of said aromatic organic compound to the corresponding chloroalkylated derivative thereof, thereby forming a reaction mixture including an organic phase of unreacted aromatic organic compound, aldehyde and chloroalkylated derivative, and an aqueous phase of hydrogen chloride and water; withdrawing a portion of said reaction mixture; cooling said withdrawn portion of said reaction mixture to a temperature which is at most room temperature; saturating the thus-cooled withdrawn portion of said reaction mixture with gaseous hydrogen chloride; reintroducing the thus-cooled and saturated withdrawn portion of said reaction mixture into the remainder of the reaction mixture, thereby reheating said reaction mixture to a temperature above about 50° C.; and repeating the withdrawing, cooling, saturating, and reintroducing steps until substantially complete conversion of said aromatic organic compound to the corresponding chloroalkylated derivative thereof.

3. A method according to claim 2 in which several chloroalkylations are carried out in separate reaction vessels and in which the saturation with hydrogen chloride of a plurality of withdrawn portions from different chloroalkylations is carried out together in a single apparatus.

4. A method of chloroalkylating organic compounds, comprising the steps of heating a reaction mixture consisting essentially of an aromatic organic compound adapted to be chloroalkylated and being selected from the group consisting of benzene, toluene, o-, m- and p-xylene, ethyl-benzene, propylbenzene, cumene, pseudocumene, mesitylene, durene, isodurene, prehnitene, p-cumene, n-butylbenzene, tert-amylbenzene, p-tert-butyltoluene, 1,3-dimethyl-5-tert-butylbenzene, 1,3,5-triethylbenzene, 1,3,5-triisopropyl-benzene, cyclohexylbenzene, biphenyl, hydrindene, naphthalene, α-methylnaphthalene, β-methylnaphthalene, tetralin, acenaphthene, anthracene, phenanthrene, 1,2-benz-anthracene, benzylchloride, benzylbromide, phenol, o-cresol, p-cresol, o-, p- and m-nitrophenols, salicyclic acid, m- and p-hydroxy-benzoic acid, n-butylphenylether, methylmesitylether, hydroquinonedimethylether, anisole, phenylether, methylphenyl-thioether, methyl-p-tolyl-thioether, salicaldehyde, anisaldehyde, 2,-4-dimethylacetophenone, acetomesitylene, benzyl-mesitylene, and 2,4,6-triethylacetophenone, an aqueous hydrogen chloride solution and an aldehyde selected from the group consisting of formaldehyde, acetaldehyde and polymers thereof at a temperature above about 50° C. so as to cause conversion of said aromatic organic compound to the corresponding chloroalkylated derivative thereof, thereby forming a reaction mixture including an organic phase of unreacted aromatic organic compound, aldehyde and chloroalkylated derivative, and an aqueous phase of hydrogen chloride and water; withdrawing a portion of said reaction mixture; cooling said withdrawn portion of said reaction mixture to a temperature which is at most room temperature; saturating the thus-cooled withdrawn portion of said reaction mixture with gaseous hydrogen chloride so as to concentrate the aqueous phase with hydrogen chloride; reintroducing the thus hydrogen chloride saturated aqueous phase into the remainder of the reaction mixture and adding additional of said aromatic organic compound and aldehyde to said reaction mixture, thereby; reheating said reaction mixture to a temperature above about 50° C.; and repeating the withdrawing, cooling, saturating, and reintroducing steps until substantially complete conversion of said aromatic organic compound to the corresponding chloroalkylated derivative thereof.

5. A method of chloroalkylating organic compounds, comprising the steps of heating a reaction mixture consisting essentially of an aromatic organic compound adapted to be chloroalkylated and being selected from the group consisting of benzene, toluene, o-, m- and p-xylene, ethylbenzene, propylbenzene, cumene, pseudocumene, mesitylene, durene, isodurene, prehnitene, p-cumene, n-butylbenzene, tert-amylbenzene, p-tert-butyltoluene, 1,3-dimethyl-5-tert-butylbenzene, 1,3,5-triethylbenzene, 1,3,5-triisopropyl-benzene, cyclohexylbenzene, biphenyl, hydrindene, naphthalene, α-methylnaphthalene, β-methylnaphthalene, tetralin, acenaphthene, anthracene, phenanthrene, 1,2-benz-anthracene, benzylchloride, benzylbromide, phenol, o-cresol, p-cresol, o-, p- and m-nitrophenols, salicylic acid, m- and p-hydroxy-benzoic acid, n-butylphenylether, methylmesitylether, hydroquinonedimethylether, anisole, phenylether, methylphenyl-thioether, methyl-p-tolyl-thioether, salicaldehyde, anisaldehyde, 2,4-dimethylacetophenone, acetomesitylene, benzyl-mesitylene, and 2,4,6-triethylacetophenone, an aqueous hydrogen chloride solution and an aldehyde selected from the group consisting of formaldehyde, acetaldehyde and polymers thereof at a temperature above about 50° C. so as to cause conversion of said aromatic organic compound to the corresponding chloroalkylated derivative thereof, thereby forming a reaction mixture including an organic phase of unreacted aromatic organic compound, aldehyde and chloroalkylated derivative, and an aqueous phase of hydrogen chloride and water; withdrawing a portion of said reaction mixture; separating the organic phase from the aqueous phase; cooling said aqueous phase of said withdrawn portion of said reaction mixture to a temperature which is at most room temperature; saturating the thus-cooled, aqueous phase of said reaction mixture with gaseous hydrogen chloride; reintroducing the thus hydrogen chloride saturated aqueous phase into the remainder of the reaction mixture and adding additional of said aromatic organic compound and aldehyde to said reaction mixture; continuing to heat said reaction mixture to a temperature above about 50° C.; repeating the withdrawing, cooling, saturating, reintroducing and continuing to heat steps until substantially complete conversion of said aromatic organic compound to the corresponding chloroalkylated derivative thereof;

and subjecting the separated organic phase to further chloroalkylating.

6. A method according to claim 5 in which several chloroalkylations are carried out in separate reaction vessels and in which the saturation of aqueous phases from a plurality of withdrawn portions from different chloroalkylations is carried out together in a single apparatus.

7. A method of chloroalkylating organic compounds, comprising the steps of continuously heating a reaction mixture consisting essentially of an aromatic organic compound adapted to be chloroalkylated and being selected from the group consisting of benzene, toluene, o-, m- and p-xylene, ethylbenzene, propylbenzene, cumene, pseudo-cumene, mesitylene, durene, isodurene, prehnitene, p-cumene, n-butylbenzene, tert-amylbenzene, p-tert-butyltoluene, 1,3-dimethyl-5-tert-butylbenzene, 1,3,5-triethylbenzene, 1,3,5-triisopropylbenzene, cyclohexylbenzene, biphenyl, hydrindene, naphthalene, α-methylnaphthalene, β-methylnaphthalene, tetralin, acenaphthene, anthracene, phenanthrene, 1,2-benz-anthracene, benzylchloride, benzylbromide, phenol, o-cresol, p-cresol, o-, p- and m-nitrophenols, salicylic acid, m- and p-hydroxybenzoic acid, n-butylphenylether, methylmesitylether, hydroquinonedimethylether, anisole, phenylether, methylphenylthioether, methyl-p-tolyl-thioether, salicaldehyde, anisaldehyde, 2,4-dimethylacetophenone, acetomesitylene, benzylmesitylene, and 2,4,6-triethylacetophenone, an aqueous hydrogen chloride solution and an aldehyde selected from the group consisting of formaldehyde, acetaldehyde and polymers thereof at a temperature above about 50° C. so as to cause conversion of said aromatic organic compound to the corresponding chloroalkylated derivative thereof, thereby forming a reaction mixture including an organic phase of unreacted aromatic organic compound, aldehyde and chloroalkylated derivate, and an aqueous phase of hydrogen chloride and water; continuously withdrawing a portion of said reaction mixture; continuously cooling said withdrawn portion of said reaction mixture to a temperature which is at most room temperature; continuously saturating the thus-cooled, withdrawn portion of said reaction mixture with gaseous hydrogen chloride; continuously reintroducing the thus-cooled and saturated withdrawn portion of said reaction mixture into the remainder of the reaction mixture; continuously continuing to heat said reaction mixture to a temperature above about 50° C.; and continuously repeating the withdrawing, cooling, saturating, reintroducing and continuing to heat steps until substantially complete conversion of said aromatic organic compound to the corresponding chloroalkylated derivative thereof.

8. A method of chloroalkylating organic compounds, comprising the steps of heating a reaction mixture consisting essentially of an aromatic organic compound adapted to be chloroalkylated and being seleceted from the group consisting of benzene, toluene, o-, m- and p-xylene, ethylbenzene, propylbenzene, cumene, pseudocumene, mesitylene, durene, isodurene, prehnitene, p-cumne, n-butylbenzene, tert-amylbenzene, p-tert-butyltoluene, 1,3-dimethyl-5-tert-butylbenzene, 1,3,5-triethylbenzene, 1,3,5-triisopropyl-benzene, cyclohexylbenzene, biphenyl, hydrindene, naphthalene, α-methylnaphthalene, β-methylnaphthalene, tetralin, acenaphthene, anthracene, phenanthrene, 1,2-benzanthracene, benzylchloride, benzylbromide, phenol, o-cresol, p-cresol, o-, p- and m-nitrophenols, salicylic acid, m- and p-hydroxybenzoic acid, n-butylphenylether, methylmesitylether, hydroquinonedimethylether, anisole, phenylether, methylphenylthioether, methyl-p-tolyl-thioether, salicaldehyde, anisaldehyde, 2,4-dimethylacetophenone, acetomesitylene, benzylmesitylene, and 2,4,6-triethylacetophenone, an aqueous hydrogen chloride solution and an aldehyde selected from the group consisting of formaldehyde, acetaldehyde and polymers thereof at a temperature above about 50° C. so as to cause conversion of said aromatic organic compound to the corresponding chloroalkylated derivative thereof; cooling said reaction mixture to a temperature which is at most room temperature; saturating the thus-cooled reaction mixture with gaseous hydrogen chloride; reheating said reaction mixture to a temperature above about 50° C.; and repeating the cooling, saturating and reheating steps until substantially complete conversion of said organic compound to the corresponding chloroalkylated derivative thereof.

References Cited in the file of this patent
UNITED STATES PATENTS

| 2,219,873 | Pinkernelle | Oct. 29, 1940 |
| 2,516,971 | Galitzenstein | Aug. 1, 1950 |

OTHER REFERENCES

Adams et al.: Organic Reactions, vol. I, pp. 63–90 (1942).

Ginsburg et al.: Ind. and Eng. Chem., vol. 38, No. 5, pp. 478–485 (1946).

Wagner et al.: Synthetic Organic Chemistry, p. 104 (1953).